United States Patent
Holst et al.

(10) Patent No.: US 11,330,826 B2
(45) Date of Patent: May 17, 2022

(54) LOW-BACTERIA MILK POWDERS WITH A HIGH WPNI (III)

(71) Applicant: DMK Deutsches Milchkontor GmbH, Zeven (DE)

(72) Inventors: Thomas Holst, Zeven (DE); Andreas Nolte, Kirchlinteln (DE)

(73) Assignee: DMK Deutsches Milchkontor GMBH, Zeven (DE)

(*) Notice: Subject to any disclaimer, the term of this patent is extended or adjusted under 35 U.S.C. 154(b) by 240 days.

(21) Appl. No.: 15/643,611

(22) Filed: Jul. 7, 2017

(65) Prior Publication Data

US 2018/0084798 A1  Mar. 29, 2018

(30) Foreign Application Priority Data

Sep. 29, 2016 (EP) .................................... 16191311

(51) Int. Cl.
*A23C 9/18* (2006.01)
*A23C 9/14* (2006.01)
*A23C 1/04* (2006.01)
*A23C 9/152* (2006.01)
*A23C 3/033* (2006.01)
*A23C 1/12* (2006.01)
*A23L 3/22* (2006.01)
*A23C 9/16* (2006.01)

(52) U.S. Cl.
CPC ................. *A23C 9/18* (2013.01); *A23C 1/04* (2013.01); *A23C 1/12* (2013.01); *A23C 3/033* (2013.01); *A23C 9/14* (2013.01); *A23C 9/152* (2013.01); *A23C 9/16* (2013.01); *A23L 3/22* (2013.01)

(58) Field of Classification Search
CPC .... A23C 9/18; A23C 1/04; A23C 9/14; A23C 9/152; A23C 9/16; A23C 1/12; A23C 3/033; A23C 3/02; A23L 3/22; A01J 11/10
USPC .................................................. 426/34, 43
See application file for complete search history.

(56) References Cited

U.S. PATENT DOCUMENTS

| | | | | |
|---|---|---|---|---|
| 2,170,402 A * | 8/1939 | Faust | ............... | G05D 23/1919 236/18 |
| 2,227,837 A * | 1/1941 | Lindgren | ............... | A01J 11/10 99/453 |
| 4,826,693 A * | 5/1989 | Smith | ............... | A23C 9/1512 426/34 |
| 5,683,733 A * | 11/1997 | Krabsen | ............... | A23C 7/046 426/491 |
| 2005/0031751 A1* | 2/2005 | Weng | ............... | A23L 3/18 426/521 |
| 2011/0030911 A1* | 2/2011 | Miyazaki | ............... | C21C 7/06 164/57.1 |
| 2013/0344219 A1* | 12/2013 | Doring | ............... | A23C 9/16 426/588 |
| 2014/0348998 A1* | 11/2014 | Hoffmann | ............... | A01J 11/10 426/491 |
| 2016/0000100 A1 | 1/2016 | Döring | | |

FOREIGN PATENT DOCUMENTS

EP  2 679 098 A  1/2014

OTHER PUBLICATIONS

NPL Oldfield et al. (International Dairy Journal 15: 501-511, 2005). (Year: 2005).*
NPL Heilig et al. (in Small Ruminant Research 78: 152-161, 2008). (Year: 2008).*
NPL Milk viscosity (Retrieved on May 17, 2021) (Year: 2021).*
Tetra Pak Dairy Processing Handbook, "Chapter 7: Designing a Process Line," Jan. 1, 2015, pp. 1-20.
Heilig et al, "Suitability of Dahlem Cashmere goat milk towards pasteurisation, ultrapasteurisation and UHT-heating with regard to sensory properties and storage stability," Small Ruminant Research vol. 78, Nos. 1-3, Aug. 1, 2008, pp. 152-161.

* cited by examiner

*Primary Examiner* — Erik Kashnikow
*Assistant Examiner* — Bhaskar Mukhopadhyay
(74) *Attorney, Agent, or Firm* — Dilworth & Barrese, LLP

(57) ABSTRACT

A low-bacteria milk powder with a high WPNI is suggested, which is obtainable by (a) providing a raw milk;
(b) heating the raw milk in at least one tubular heat exchanger to a temperature of at least 20° C.;
(c) separating the cream, obtaining a skimmed milk;
(d) pasteurising the skimmed milk in a tubular heat exchanger for a period from 10 to 60 seconds at a temperature from 72 to 75° C.;
(e) evaporating the pasteurised skimmed milk to a dry matter content from 35 to 55% by weight; and
(f) drying the pasteurised skimmed milk concentrate in a spray tower.

5 Claims, 1 Drawing Sheet

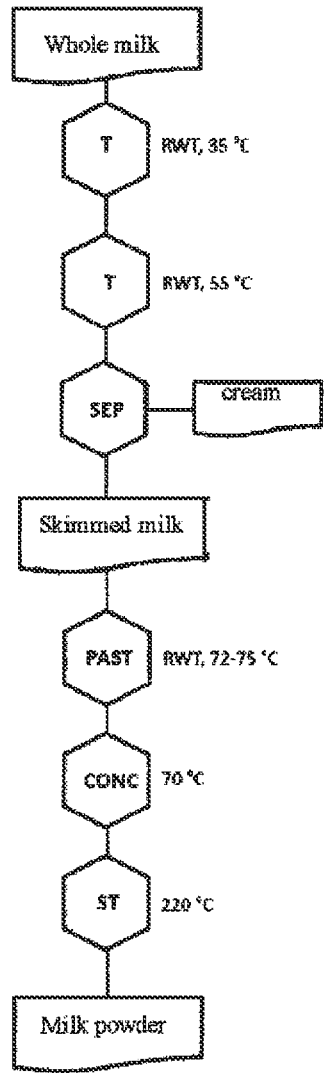

LOW-BACTERIA MILK POWDERS WITH A HIGH WPNI (III)

FIELD OF THE INVENTION

The invention is in the field of dairy products and relates to a process for the production of spray-dried milk powders which are characterised by exhibiting both a reduced bacterial contamination and a high WPNI.

STATE OF THE ART

For the production of low-bacteria milk powders, for example, already pasteurised skimmed milk with a dry matter content of about 9% is evaporated to a concentration of about 40%. However, the concentrates still contain a large quantity of heat-resistant bacteria and spores, which particularly originates from the maize silage fed to the cows, and which ends up in the raw milk as a result of insufficient stable hygiene. For this reason, it has been required to this date to subject the concentrates to high temperature treatment before spraying, by means of which the bacteria and spores are quantitatively destroyed, and as a result of which a bacteria-free and high-quality product is obtained.

However, high temperature treatment does not only have an effect on the bacteria and spores, also the valuable whey proteins are denatured, either completely or to a very large extent, thus adversely changing the product in its functionality and nutritional physiology. Whey proteins are in albumins and globulins; they particularly include alpha-lactalbumin and beta-lactoglobulin, serum albumin, proteose peptone and the immunoglobulins. From a nutritional perspective, whey proteins are high-value milk constituents, which are specifically used to build muscle, for example, in protein supplements. While untreated skimmed milk has a so-called whey protein nitrogen index (WPNI) of above 6, specifically of 6.1, as a parameter for its whey protein content, this value falls below 1 during regular ultra-high temperature treatment, which is extremely undesired.

An alternative for this might consist in performing the temperature treatment at lower temperatures, for example, at about 70° C. instead of more than 100° C. In fact, products such obtained have a WPNI of above 5, however, the bacterial contamination is so high that products are obtained which are, at best, difficult to market.

In this context, it is referred to CN 2011 1116530 A1, which discloses a process for the production of low temperature milk powder, in the process of which skimmed milk is subjected to microfiltration at between 40 to 50° C., and filtered through an inorganic membrane with a pore size from 0.8 to 1.4 µm. Subsequently, the microfiltration product is sterilised at between 72 and 78° C. and concentrated at between 45 and 75° C. in a falling film evaporator. This is followed by spray drying, in the process of which the temperature at the inlet is between 180 and 200° C., and between 80 and 105° C. at the outlet. The document neither specifies the WPNI of the resulting products, nor does it contain any information on the bacterial contamination thereof.

EP 2679098 A1 (DMK) also discloses a process for the production of low-bacteria milk powders, wherein a microfiltration step is used to separate the bacteria; this application, however, does not contain any reference on the production of powders enriched with active agents.

While filtration processes as a process step in dairy processing are very suitable for at least significantly reducing the bacterial contamination, this is a technically complex and thus costly measure which is not likely to be realised in the context of low sales prices for dairy products.

Therefore, the production of milk powders usually comprises the following steps: The raw milk is heated to 55° C. in a combined heat exchanger/separator, initially in a plate heat exchanger (PWT—Plattenwärmetauscher), and then the cream is separated. The skimmed milk is heated in an evaporator, is then pasteurised in a tubular heat exchanger (RWT—Röhrenwärmetauscher) (72-75° C., 15-45 s) and cooled down in a further PWT to 8° C. From this point, it is heated to more than 70° C. in the next PWT and is then concentrated. In order to operate the concentrator in continuous mode, the milk is introduced into a buffer tank and introduced into the concentrator from this point. The concentrated milk leaves the concentrator at a temperature of about 40° C., is re-heated to 70° C., and spray-dried at 200° C. The powder leaves the tower at a temperature of about 30° C.

This conventional mode of operation, however, entails a number of disadvantages:

1. In plate heat exchangers, thermophilic bacteria find optimum growth conditions at about 55° C. Also the intermediate re-heating leads to a strong growth of bacteria.
2. Whey proteins—particularly when present in non-concentrated milk—do not tolerate any temperatures exceeding 70° C. which are, however, required to kill the bacteria. Therefore, the resulting powders have a WPNI of 6.2 maximum.
3. The powders made in the tower have more than 1,000 thermophilic and more than 5,000 mesophilic bacteria, which is still admissible, but which should be reduced.

The object of the present invention was therefore to provide a simplified process for the production of powders made in the tower on the basis of skimmed milk, wherein the powders should exhibit a lower bacteria count and a higher WPNI at the same time.

DESCRIPTION OF THE INVENTION

A first subject-matter of the invention relates to a low-bacteria milk powder with a high WPNI, which is obtainable by (a) providing a raw milk;
(b) heating the raw milk to a temperature of at least 20° C. in at least one tubular heat exchanger;
(c) separating the cream, obtaining a skimmed milk;
(d) pasteurising the skimmed milk in a tubular heat exchanger for a period from 10 to 60 seconds at a temperature from 72 to 75° C.;
(e) evaporating the pasteurised skimmed milk to a dry matter content from 35 to 55% by weight; and
(f) drying the pasteurised skimmed milk concentrate in a spray tower.

Preferably, the milk powder according to the invention contains less than 1,000 thermophilic and/or less than 5,000 mesophilic bacteria and/or no pathogenic bacteria, and is characterised by a WPNI of at least 6, preferably from 7.0 to 7.5. In doing so, the object of providing a qualitatively improved product described above has not only been completely fulfilled, this task has also been solved in a significantly less technically complex way.

BRIEF DESCRIPTION OF THE DRAWING

The present invention will be described in greater detail with reference to the accompanying drawing which is a flow chart illustrating the method according to the present invention.

Process

A further subject-matter of the invention relates to a process for the production of a low-bacteria milk powder with a high WPNI, comprising the following steps:
(a) providing a raw milk;
(b) heating the raw milk to a temperature of at least 20° C. in at least one tubular heat exchanger;
(c) separating the cream, obtaining a skimmed milk;
(d) pasteurising the skimmed milk in a tubular heat exchanger for a period from 10 to 60 seconds at a temperature from 72 to 75° C.;
(e) evaporating the pasteurised skimmed milk to a dry matter content from about 35 to about 55% by weight.
(f) drying the pasteurised skimmed milk concentrate in a spray tower.

Preferably, milk powders are produced by the process according to the invention that contain less than 1,000 thermophilic and/or less than 5,000 mesophilic bacteria and/or no pathogenic bacteria, characterised by a WPNI of at least 6, preferably from 7.0 to 7.5.

Separation

Separation (steps b and c) is understood as being the separation of the cream up to a fat content of about 0.5% by weight, and the removal of solids. The process is performed under hot conditions at a temperature in the range from about 50 to about 60° C., or under cold conditions at a temperature from about 15 to about 35° C.

In the process according to the invention it may be advantageous to perform the separation cold. In doing so, it is advantageous if the temperature of the cold condition of the raw milk is adjusted to a value that is optimal for separation by means of heat exchange using a heat carrier medium. Usually, the raw milk is available in a cooled condition, the temperature of which does not correspond to the value where cold separation can be performed most effectively and most gently with respect to the milk fat (cream). It is, therefore, adapted to the value that is optimal for separation by means of heat exchange. The exchanged cold temperature from the process may be made available to other processes that are carried out in a dairy, particularly by a so-called heat exchanger. For example, the temperature of the cooled raw milk does not exceed 6° C., while the optimum temperature for cold separation is in the range of about 20° C. In this case, heat exchange is performed by heating the raw milk, so that the temperature of the cold condition thereof is increased to a value within this range. In dairies there usually is excess heat. Therefore, low temperature water obtained in dairy processes can be used as a heat carrier medium for heating. Said low temperature water is supplied to the heat exchange process at a temperature which is, for example, in the range of 40° C., and is then cooled down by heat exchange to a temperature which is, for example, in the range of 25° C. In doing so, the process of the invention provides an important cold source for dairy processes.

Within the present invention, tubular heat exchangers are employed instead of plate heat exchangers which are commonly used otherwise. Surprisingly, this measure leads to the fact that the growth of thermophilic bacteria is significantly reduced, even at otherwise optimum conditions at 55° C. In doing so, it has proved to be particularly advantageous to perform the heating of the raw milk in step (b) in two serially connected heat exchangers, of which at least one represents a tubular heat exchanger, wherein the milk in the first exchanger is heated to about 35° C., and to 55° C. in the second one.

The separation of solids and the skimming of a fat content of about 4% by weight is usually carried out in a downstream component, preferably a separator. Said components are adequately known from the state of the art. Separators of the company GEA Westfalia Separator GmbH, which allow the joint or single separation of solids (http://www.westfalia-separator.com/de/anwendungen/molkereitechnik/milch-molke.html), are widely used in the dairy industry. Preferred cold milk separators are marketed by the manufacturer under the name "Procool". Corresponding components have also been disclosed, for example, in DE 10036085 C1 and DE 10361526 B3 (Westfalia) and are perfectly known to one skilled in the art. Therefore, no explanations are needed on how to carry out these process steps.

Pasteurisation

This process step (d) is a legal measure intended to ensure that the milk may be considered microbiologically safe and be approved for consumption. Pasteurisation is preferably performed in heat exchangers, and also herein tubular heat exchangers have again proved to be particularly suitable. There is a temperature gradient at the heat exchangers, which, however, is selected such that the product is heated to a temperature from about 70 to 80° C. and particularly from about 72 to 75° C. for a residence time of a minimum of 10 and a maximum of 60 seconds, preferably about 30 seconds.

Concentration

The pasteurised milk leaves the tubular heat exchanger, optionally after passing a device for keeping food warm at a temperature of about 40° C. This is followed by a step in which the pasteurised skimmed milk is dehydrated and concentrated to a dry matter content from about 30 to about 55% by weight, and particularly from about 35 to about 45% by weight. Conventional evaporators are particularly suitable for this. However, there had been a prejudice up to the date of application that an evaporator may only be reliably operated in continuous mode if it is supplied with a similarly continuous stream of milk. In other words, if the quantity of milk coming from the pasteurisation step oscillates—which may always be the case in large plants—the evaporator will operate irregularly. For this reason, plant developers have always provided that the milk is initially pumped into a feed tank ("buffer tank") either after the milk has left the separator or after it has passed the pasteurisation step; from this tank it is then, in fact, possible to continuously supply the milk into the evaporator. However, this measure is particularly disadvantageous, because storage is either performed at comparably low temperatures in the range of about 55° C. so that the temperature difference compared with the evaporator is not too large, or it is performed at the approximately same temperature as in the evaporator, i.e. at about 75° C. In the first case, the whey proteins are saved, but there are ideal conditions for the growth of thermophilic bacteria; in the second case, a large part of the valuable proteins is denatured, in addition—which has not been known to this date either—a rapid growth of bacteria is still taking place also at 70° C., as can be taken from the following Table 1:

TABLE 1

Growth of thermophilic bacteria as a
function of time and temperature

| Temperature [° C.] | Time [h] | Bacteria count/ml |
|---|---|---|
| 65 | 1 | 2,300 |
|  | 2 | 10,100 |
|  | 3 | 830,000 |
|  | 4 | 1,290,000 |
|  | 5 | 2,540,000 |
| 70 | 1 | 1,900 |
|  | 2 | 4,100 |
|  | 3 | 510,000 |
|  | 4 | 340,000 |
|  | 5 | 1,700,000 |
| 75 | 1 | 300 |
|  | 2 | 100 |
|  | 3 | 200 |
|  | 4 | <100 |
|  | 5 | <100 |
| 80 | 1 | 100 |
|  | 2 | 100 |
|  | 3 | 100 |
|  | 4 | 100 |
|  | 5 | 100 |

In addition, also the damage of the whey proteins caused by temperature proves to be significantly more serious than had been known to this date, as is shown by the course of the WPNI of a pasteurised skimmed milk stored at 74° C. according to Table 2:

TABLE 2

Growth of thermophilic bacteria as a function
of time and temperature (74° C.)

| Time [s] | WPNI-preparation 1 | WPNI-preparation 2 |
|---|---|---|
| 30 | 7.62 | 7.18 |
| 300 | 7.38 | 6.90 |
| 600 | 5.94 | 6.86 |
| 900 | 5.76 | 5.61 |
| 1,200 | 5.60 | 5.03 |
| 1,500 | 5.40 | 4.38 |
| 1,800 | 4.62 | 4.19 |
| 2,100 | 4.37 | 3.89 |
| 2,400 | 4.29 | 3.83 |
| 2,700 | 4.20 | 3.09 |

The applicant therefore decided to dispense with the interposition of a feed tank, originally planning to take into account that the evaporator might exhibit operational disturbances; however, this has surprisingly proved to be a technical prejudice, as modern evaporators can tolerate oscillations of the quantity used without causing any problems. This finding was the key for being able to produce milk powders which are also characterised by an improved quality in a more simple way. Accordingly, the particular findings of the invention include the fact that milk is not temporarily stored between the individual process steps.

Further water-soluble additives and adjuvants may be added to the skimmed milk, either before or, preferably, after evaporation.

Drying

In the following process step, the skimmed milk concentrate is dried. Spray drying is preferably used here, with the temperature in the inlet typically ranging from about 180 to about 260° C., preferably, about 220° C., and from about 80 to about 105° C. at the outlet. The milk concentrate can be pre-heated to about 75° C., preferably, however, it is not heated any further before entering the spray tower; this also ensures that there is neither a growth of bacteria nor a denaturation process. Alternatively, the products may also be dehydrated by belt drying, freeze drying and the like.

Further additives in powder form may be added to the product before, but preferably after spraying such as, for example, lactoferrin, lecithins, vitamins or food emulsifiers [EP 1314367 A1, NESTLE] and the like.

INDUSTRIAL APPLICATION

A further subject-matter of the invention relates to the use of the milk powder of the invention for human nutrition.

EXAMPLES

Comparison Example 1

Comparison example V1 relates to a common continuous process for the production of a skimmed milk powder which is sprayed via a tower.

To this end, raw milk is directed over a plate heat exchanger and heated to 55° C.; in the connected separator the separation of the cream is performed, as a result of which a skimmed milk is obtained. This milk is heated to a temperature of between 72 and 75° C. in a combination of two plate heat exchangers, and is left there for about 30 seconds. The milk such pasteurised is cooled down to about 8° C. to prevent the growth of thermophilic bacteria, and is re-heated to 70° C. directly before concentration, in the process of which the sequence of heating and cooling is essentially performed by heat exchange so that the loss of energy, in sum, is low. The heated milk is supplied to a collection tank, from which the evaporator is continuously supplied. At this moment, the concentrate with a dry matter content of about 55% by weight has a WPNI of 6.5. The concentrate leaves the evaporator at a temperature of below 40° C. and enters a further plate heat exchanger in which it is heated to above 70° C. This entails a decrease of the WPNI to 6.2. The pre-heated concentrate is sprayed at 200° C. and leaves the tower at a temperature of 30° C., after passing further heat exchangers. The powder has a residual moisture of less than 5% by weight and a WPNI of between 6.0 and 6.2. Microbiological analysis shows that between 1,000 and 5,000 thermophilic bacteria and between 5,000 and 10,000 mesophilic bacteria are still present. On this basis, the powder can be classified as suitable for human nutrition.

Example 1

Example 1 of the invention shows how not only the technical complexity can be reduced and the WPNI can be increased, reducing the bacteria count in a skimmed milk powder at the same time even though certain process steps are omitted.

To this end, raw milk is heated in two steps in a combination of a first plate heat exchanger and a second tubular heat exchanger, initially to 35° C., followed by 55° C., and the cream is separated by a process known per se. The skimmed milk such obtained is pasteurised at 72 to 75° C. for a period of about 30 seconds in a further tubular heat exchanger without any further temperature treatment and without being temporarily stored, and is then introduced into the evaporator in a buffer tank, also without being temporarily stored. The concentrate with a dry matter content of about 55% by weight leaves the concentrator at a temperature of about 40° C., having a WPNI of 7.5. Without any further heating, it is directly applied to the tower and sprayed at 200° C. A powder with a residual moisture of less than 5% by weight is obtained, having a WPNI from 7.3 to 7.5. Microbiological analysis shows that the number of the thermophilic bacteria is below 1,000, and also the number of the mesophilic bacteria is below 5,000.

Comparison Example V2

Example 1 was repeated; a buffer tank was interposed downstream of the separator and upstream of the heater, in which the milk was stored at 55° C. to ensure that the evaporator was continuously supplied with product. The powder obtained after spraying did have a WPNI of 7.3, however, it contained between 1,000 and 5,000 thermophilic bacteria and between 5,000 and 10,000 mesophilic bacteria.

Comparison Example V3

Example 1 was repeated; a buffer tank was interposed directly upstream of the heater, in which the milk was stored at 74° C. to ensure that the evaporator was continuously supplied with product. The powder obtained after spraying did contain less than 1,000 thermophilic bacteria and about 5,000 mesophilic bacteria, however, only a WPNI of 6.4 was achieved.

These examples and comparison examples show that the employment of tubular heat exchangers is advantageous in comparison with plate heat exchangers. This also helps overcome the prejudice that continuous evaporation is only possible when the milk is stored in a buffer tank.

Example 1 is further explained in a flow chart (FIG. 1). The abbreviations have the following meanings:
T=temperature treatment
RWT=tubular heat exchanger
SEP=separator
PAST=pasteurisation
CONC=evaporator
ST=spray tower
The first RWT may also be replaced by a plate heat exchanger.
The concentration step may be followed by a heating step in a heat exchanger of up to 75° C. if required.

The invention claimed is:

1. A process for the production of a low-bacteria milk powder with a high whey protein nitrogen index, consisting of the following steps:
   (a) providing raw milk;
   (b) heating the raw milk in a first heat exchanger and a second heat exchanger, wherein at least one of said first heat exchanger and said second heat exchanger is a tubular heat exchanger, and wherein said first heat exchanger and said second heat exchanger are serially connected, and further wherein the raw milk is heated to about 35° C. in said first heat exchanger and to about 55° C. in said second heat exchanger;
   (c) separating cream to obtain skimmed milk in a separator;
   (d) pasteurising the skimmed milk in a further tubular heat exchanger for a period from 10 to 60 seconds at a temperature from 72 to 75° C. to obtain a pasteurized skimmed milk;
   (e) evaporating the pasteurised skimmed milk to a dry matter content from about 35 to about 55% by weight to obtain a pasteurised skimmed milk concentrate; and
   (f) drying the pasteurised skimmed milk concentrate in a spray tower to obtain the low-bacteria milk powder wherein said milk powder having a whey protein nitrogen index of at least 6 is produced and said milk powder has less than 1,000 thermophilic bacteria per mg. and/or less than 5,000 mesophilic bacteria per mg and/or no pathogenic bacteria are produced;
   wherein each of the process steps a-f is carried out without storing the milk.

2. The process of claim 1, wherein said milk powder having a whey protein nitrogen index of between 7.0 and 7.5 is produced.

3. The process of claim 1, wherein the pasteurised skimmed milk concentrate is directly sprayed.

4. The process of claim 1, wherein spray drying is performed at a temperature in the range from about 180 to about 260° C.

5. The process of claim 1, wherein the pasteurised skimmed milk concentrate is heated to a temperature of about 75° C. before the drying step (f).

* * * * *